United States Patent
Sudo et al.

(10) Patent No.: US 8,241,720 B2
(45) Date of Patent: Aug. 14, 2012

(54) ARTICLE SUPPORT STRUCTURE AND ARTICLE ATTACHMENT KIT

(75) Inventors: Yasuo Sudo, Tokyo (JP); Eiji Mizuno, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 129 days.

(21) Appl. No.: 12/162,518

(22) PCT Filed: Jan. 31, 2007

(86) PCT No.: PCT/US2007/002567
§ 371 (c)(1),
(2), (4) Date: Nov. 21, 2008

(87) PCT Pub. No.: WO2007/089795
PCT Pub. Date: Aug. 9, 2007

(65) Prior Publication Data
US 2009/0205784 A1   Aug. 20, 2009

(30) Foreign Application Priority Data
Feb. 1, 2006   (JP) .................................. 2006-024464

(51) Int. Cl.
*B32B 33/00* (2006.01)
(52) U.S. Cl. ......................... 428/40.1; 428/343; 156/391
(58) Field of Classification Search .................. 156/391; 428/40.1, 343
See application file for complete search history.

(56) References Cited

U.S. PATENT DOCUMENTS

| | | | |
|---|---|---|---|
| 4,652,473 A | 3/1987 | Han | |
| 6,001,471 A * | 12/1999 | Bries et al. | 428/343 |
| 6,106,937 A * | 8/2000 | Hamerski | 428/343 |
| 2003/0047654 A1* | 3/2003 | Johansson et al. | 248/205.3 |
| 2006/0068144 A1* | 3/2006 | Mizuno et al. | 428/40.1 |

FOREIGN PATENT DOCUMENTS

| | | |
|---|---|---|
| DE | 3331016 C2 | 7/1992 |
| JP | 6-209842 A | 2/1994 |
| JP | 6-504077 | 5/1994 |
| JP | 8-311414 | 11/1996 |
| JP | 2002-517542 | 6/2002 |
| JP | 2004-41535 | 2/2004 |
| WO | WO 92/11333 A1 | 9/1992 |
| WO | WO 97/07172 A1 | 2/1997 |

* cited by examiner

*Primary Examiner* — Khanh P Nguyen
*Assistant Examiner* — Vishal I Patel
(74) *Attorney, Agent, or Firm* — David B. Patchett

(57) ABSTRACT

To provide an article support structure used when attaching an article to an adherend with a stretch-releasable adhesive tape in which components and the like do not fly off when releasing the adhesive tape from the adherend, the double-sided adhesive tape does not tear, and damage to high-sensitivity adherends can be effectively suppressed. An article support structure comprises a base plate which can be removably attached to an article, and a double-sided adhesive tape intervening between the base plate and an adherend, and having a stre tenable base material and an adhesive layer. The base plate has a project ion-shaped gripping member, and at least one pair of spacer members disposed on both sides thereof which can form a gap between the surface of the adherend and the bottom surface of the base plate, and is configured so that the position of the gripping member and the position of the spacer members at least partly overlap in the length direction of the "double-sided adhesive tape.

14 Claims, 2 Drawing Sheets

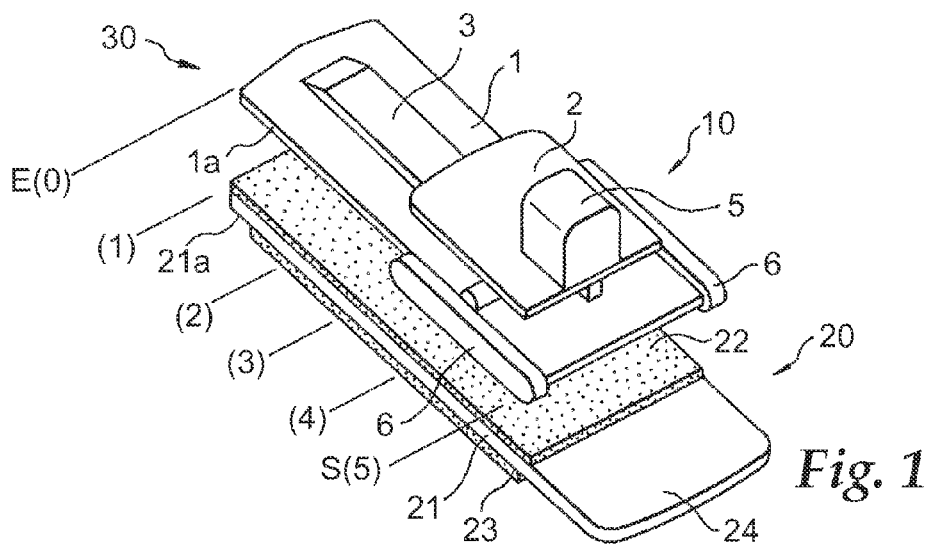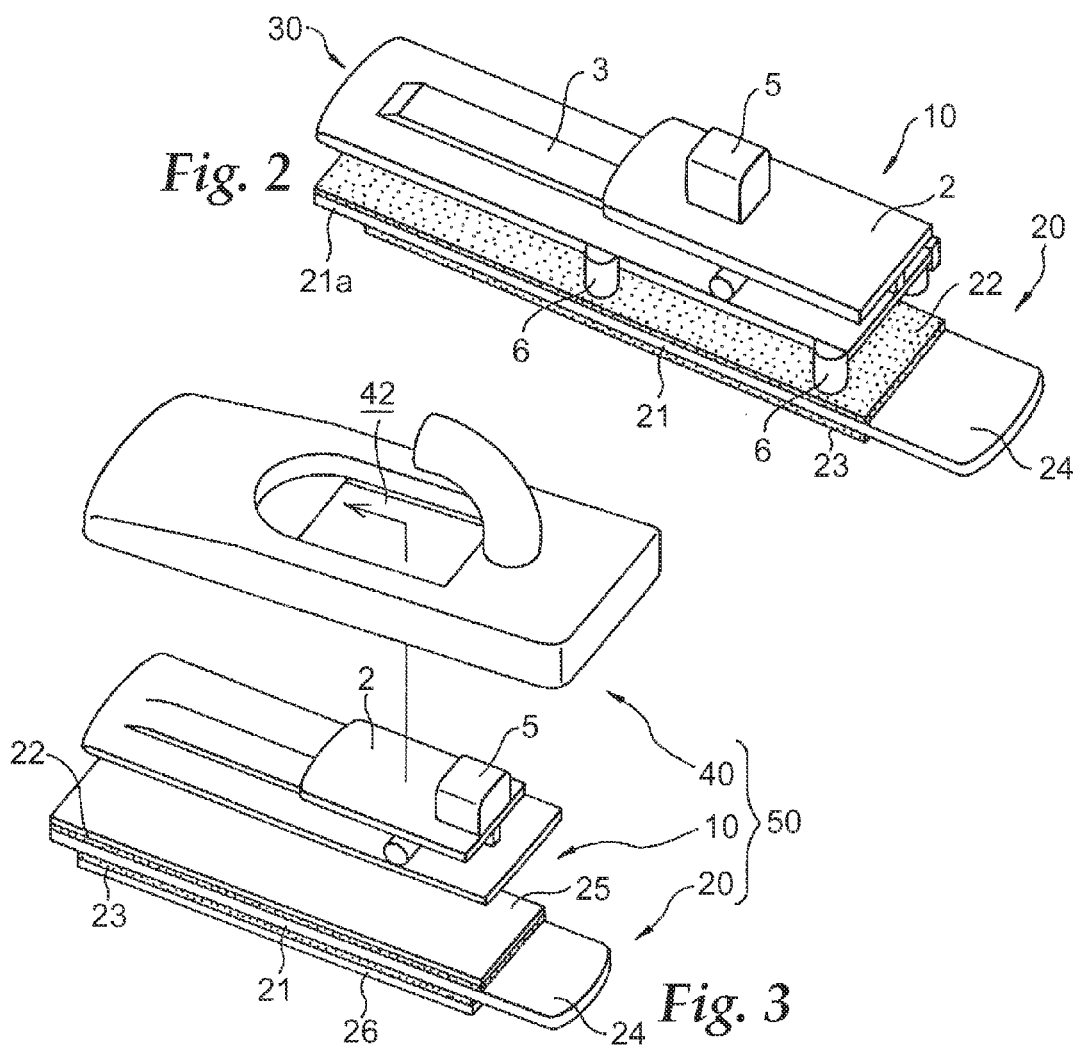

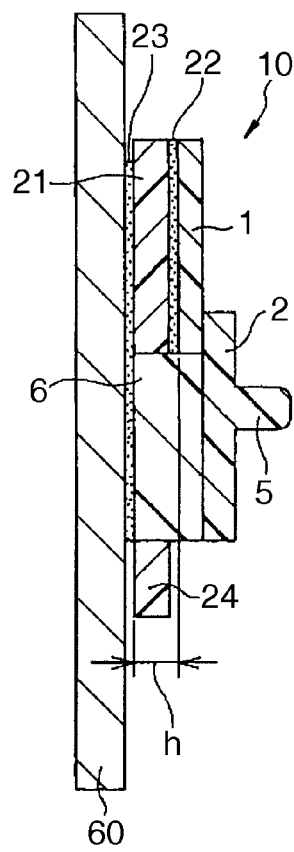
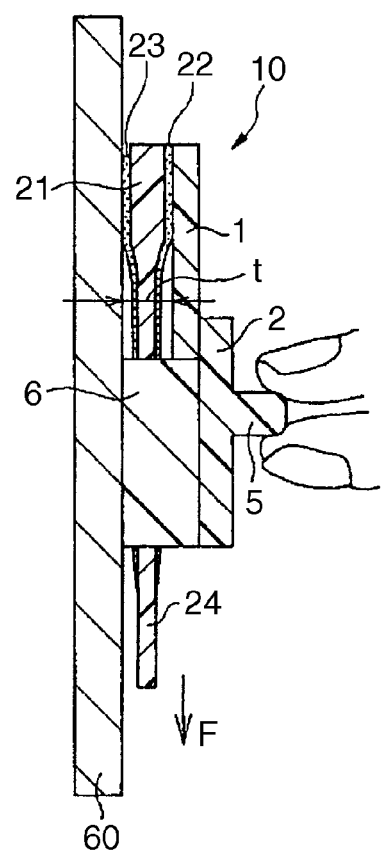
*Fig. 4A*    *Fig. 4B*
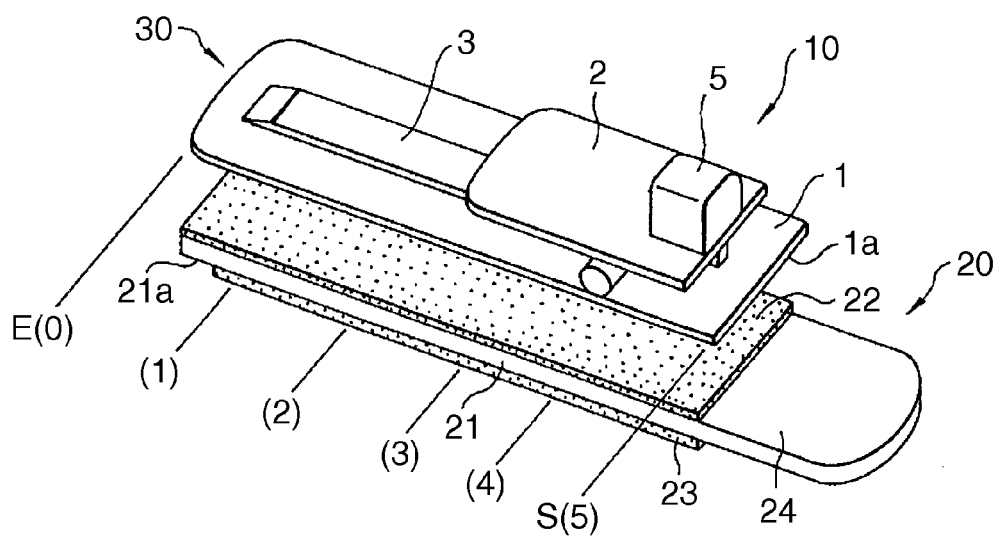
*Fig. 5*

ARTICLE SUPPORT STRUCTURE AND ARTICLE ATTACHMENT KIT

CROSS REFERENCE TO RELATED APPLICATIONS

This application is a national stage filing under 35 U.S.C. 371 of PCT/US2007/002567, filed Jan. 31, 2007, which claims priority to Japanese Patent Application No. 2006-024464, filed Feb. 1, 2006, the disclosures of which is incorporated by reference in their entirety herein.

BACKGROUND

The present invention relates to an article support structure, and more particularly to an article support structure and article attachment kit employed when attaching an article to an adherend via a double-sided adhesive tape.

A variety of types of sticky film and sticky tabs and the like, commonly referred to as adhesive tape, have been proposed and implemented for diverse purposes. For example, stretch-release adhesive tape being releasable adhesive tape in which the adhesive tape is stretched and can be removed from the adherend without damage to the adherend, has been implemented in recent years.

For example, in International Patent Publication (Kohyo) No. 6-504077, a removable adhesive tape being an adhesive tape comprised of pressure-sensitive adhesive supported on a backing and at least one primary surface, wherein the backing can be stretched to a rupture point of between 150% and 1200% in the length direction with elastic recovery following extension of less than 50%, and having a Young's modulus of at least 175.8 kg/cm$^2$ (2500 psi) and less than 5097 kg/cm$^2$ (72,500 psi), the tape can bond strongly to the base material, and furthermore can be removed after pulling at an angle of 35° or less with the surface of the base material, and the backing has a rupture point tensile strength sufficiently high so that the backing is not destroyed prior to removal of the tape from the surface of the base material, is disclosed. An example of a commercially available stretch releasable adhesive tape is the product 'Command' available from 3M Corp., St. Paul, Minn.

Furthermore, in German Unexamined Patent Publication (Kokai) No. 3331016, a stretch-release adhesive tape based on a thermoplastic rubber such as a styrene-butadiene block copolymer and an adhesive forming resin such as a rosin conductor, having a high rubber elasticity and low plasticity, adhesive strength less than cohesive strength, retaining strength appropriately reduced by stretching of the tape, a ratio of release strength to tensile strength of 1:2 or greater, and bonding due to the adhesive manifested by the tape cancelled in the direction of the adhesive surface during stretching of the adhesive tape, is disclosed. It is reported that this adhesive tape, also, can be stretched and removed without damage to the adherend. However, when this adhesive tape is applied to polyvinyl chloride films including a plasticizer, for example walls covered in soft polyvinyl chloride-based wallpaper, the plasticizer migrates to the adhesive of the tape, and both adhesive strength and cohesive strength are reduced.

Adhesive tapes suitable for application to soft polyvinyl chloride films including large amounts of plasticizer have also been proposed. For example, in Japanese Unexamined Patent Publication (Kokai) No. 8-311414, an acrylic adhesive tape formed from a plurality of adhesive layers, the exposed adhesive layer formed from an adhesive comprised of an adhesive being primarily formed of 100 parts by weight of a copolymer of (meta) alkyl acrylate ester monomer and between 1 and 10 parts by weight of a (meta) acrylic monomer, and this associated adhesive layer being formed from an adhesive comprised primarily of a copolymer of (meta) alkyl acrylate ester, is disclosed. This adhesive tape is reported as showing sufficient values for initial adhesive strength and cohesive strength, with both being balanced, and superior adhesive performance without migration of plasticizers and the like in polyvinyl chloride plastics, especially thermoplastic polyvinyl chloride plastics.

However, when the adhesive used in the adhesive tape is applied to polyvinyl chloride plastic wallpaper, additional to difficulties derived from the material, difficulties occur in following the concave-convex structure of the surface associated with the design of the wallpaper.

An adhesive system adhering well to an adherend having a concave-convex structure of the surface, and to a polyvinyl chloride plastic adherend, and an adhesive method, have been previously proposed. However, when the adhesive tape is released from the adherend, the adherend in which the adhesive tape is applied may be damaged or destroyed in some cases. This problem occurs particularly with wallpaper in wide domestic use, otherwise known as 'cloth'. This is due to the fact that wallpaper comprises a foam plastic material being of very high-sensitivity, and therefore in the final stage of the process of release, there is the possibility that at least part of the wallpaper surface may be damaged. Under certain conditions, at the completion of the process of release, there is the possibility that part of the wallpaper surface may tear, and simultaneously, plastic fragments (for example, hooks, and support parts attached to hooks) applied to the wallpaper may fly-off.

In International Patent Publication (Kohyo) No. 8-507941, an article support adhering to a base (the 'adherend' in the present application), including a base plate and a stretch-release adhesive tape adhering to the base plate, and wherein by pulling the adhesive tape from the base surface at an angle of approximately 35° or less, the base plate can be released from the base, is disclosed. With this article support, since a part without adhesive is created only on the top side of the double-sided adhesive tape, and this part is applied to the base plate, when the adhesive tape is stretched and released from the base, the base plate separates first from the adhesive tape, and the base plate flying-off can be prevented. However, with the article support of this configuration, since the stretch-release force must be supported by the surface of the base, a large tensile stress is applied by the base, and therefore, with wallpaper such as high-sensitivity polyvinyl chloride and the like, the wallpaper surface may be damaged.

Furthermore, in International Patent Publication (Kohyo) No. 2002-517542, an adhesive product suitable for releasable application to a support surface being the surface of the adherend, and including a base plate and a stretch-release adhesive strip (adhesive tape) between the bottom of the base plate and the support surface, and further including joining means (a projecting part) to engage support surfaces when pressed in the direction of the support surface, is disclosed. With this adhesive product, since a projecting part is provided on the base plate, a fixed gap can be provided between the adherend and the adhesive product even when the adhesive product is pressed in the direction of the support surface, and therefore damage to, and tearing of, the adhesive strip can be prevented. However, despite the above, it is difficult to stretch-release the surface of the highly-sensitive adherend in the final stage of stretch-release without damage due to the end of the adhesive strip.

Furthermore, in Japanese Unexamined Patent Publication (Kokai) No. 2004-41535, a hanger fitting having a base attached to the attachment surface of an adherend such as a wall and the like with a double-sided adhesive tape, and a hanger fitting body able to be freely attached to and removed from the base, and a projection-shaped holder part preventing the base flying off when the stretch-release tape is pulled off the attachment surface of the adherend, in a hanger fitting using stretch-release tape released in a direction approximately parallel to the attachment surface as a double-sided adhesive tape. With this hanger fitting, since the projection-shaped holder part is provided, the stretch-release tape is clamped in this projection-shaped holder part and pulled off, and careless flying-off of the base can be prevented. However, if the force applied to the holder part is in the direction in which the hanger fitting is pressed against the wall surface, tearing midway along the stretch-release tape, and damage to the wall surface and the like may occur.

SUMMARY

The problem of the article support body and hanger fitting proposed in prior art is the fact that the user's expectations of the product are not fulfilled in some cases. In other words, despite using the product with the expectation that the adhesive tape can be cleanly peeled off after use, when the adherend is of a highly-sensitive material, the adherend may be damaged in practice in some cases.

Therefore, the present invention provides an article support structure used when attaching an article to an adherend with a stretch-release double-sided adhesive tape with which the article can be readily and precisely attached, and can effectively suppress damage to highly-sensitive adherends without the components and the like of the article support structure flying off, and without tearing the double-sided adhesive tape, when releasing the double-sided adhesive tape from the adherend.

The present invention also provides an article support structure which can be used beneficially in hanging, with hooks and the like, a variety of articles on adherends of polyvinyl chloride plastic including plasticizers as necessary, and having a fine concave-convex surface pattern, especially wallpaper and cloth products.

The present invention further provides an article support structure and an article attachment kit using this article support structure in which the balance between adhesive strength and cohesive strength of re-releasable double-sided adhesive tape is superior, and which can be applied beneficially to various adherends.

The article support structure of the present invention is used when attaching an article through a stretch-releasable double-sided adhesive tape to an adherend, and has a base plate which can be removably attached to an article or accessory member thereof. The base plate has a projection-shaped gripping member on the surface opposite to the surface facing the adherend, and at least one pair of spacer members provided on both sides thereof which can form a gap less than the thickness of the double-sided adhesive tape when adhered in place, and greater than the thickness of the double-sided adhesive tape when released, between the surface of the adherend and the bottom surface of the base plate, when the double-sided adhesive tape is stretch-released. The position of the gripping member and the position of the spacer members at least partly overlap in the length direction of the double-sided adhesive tape.

Furthermore, the article attachment kit of the present invention includes the kit comprising the article support structure of the present invention and a stretch-releasable double-sided adhesive tape comprising a stretchable base material and an adhesive tape provided on both sides of the base material, the kit comprising the article support structure of the present invention and an article comprising a hook for hanging an article, and the kit comprising the article support structure of the present invention, the article or accessory member thereof and a stretch-releasable double-sided adhesive tape comprising a stretchable base material and an adhesive layer provided or both sides of the base material.

According to the present invention, as is apparent from the detailed description below, an article support structure of compactness and superior ease of handling, which can readily and precisely attach an article to the adherend with a double-sided adhesive tape, can be provided. This article support structure can readily and precisely attach an article to an adherend. Particularly, by using a double-sided adhesive tape with which stretch-release, in other words, stretching of the adhesive tape for ready removal from the adherend, is possible following application to the adherend, the adhesive tape can be stretched and readily removed from the adherend, and excessive force is unnecessary when pulling the double-sided adhesive tape off the adherend, and smooth release is possible. Furthermore, when the double-sided adhesive tape is released from the adherend, the article support structure and parts thereof and the like do not fly off, and also the double-sided adhesive tape does not tear or the adhesive does not remain. With this article support structure, in particular, tearing of, and damage to, the adherend due to the double-sided adhesive tape, can be beneficially suppressed, even with a high-sensitivity adherends.

Furthermore, the article support structure of the present invention can be conveniently realized in the home and workplace and the like by use of the article attachment kit of the present invention.

The present invention is an article support structure and an article attachment kit used when attaching an article with a double-sided adhesive tape which can be stretch-released from the adherend, and can be implemented in a variety of embodiments. While not limited to the following embodiments, only the desirable embodiments of the present invention are described.

The embodiments of the article support structure of the present invention are used with a stretch-release double-sided adhesive tape. The double-sided adhesive tape (hereafter also referred to as 'adhesive tape') is highly stretchable, can bond strongly to the surface of many adherends, and the bond can be stably maintained. When releasing the adhesive tape from the adherend, by pulling the adhesive tape from the surface of the adherend at an angle of no greater than approximately 35°, the adhesive tape can be readily released, and without adhesive and the like remaining on the surface of the adherend. Furthermore, the article support structure used by applying adhesive tape to the surface opposite the adherend has a variety of embodiments according to the mode of use, shape, and size and the like of the article. However none of these structures hinder the stretch-release qualities of the adhesive tape, and even at the end of the process of releasing the adhesive tape, do not tear or damage the adherend, especially the wallpaper surface, in contrast to conventional adhesive tape. The double-sided adhesive tape which can be beneficially used in the implementation of the present invention is further described below.

The article support structure can have a variety of embodiments according to the mode of use, shape, and size and the like, however the article support structure generally has a base plate in association with the supported article. The base plate is normally comprised of a plate-shaped body, and a double-sided adhesive tape is either already applied to one surface (the surface applied to the adherend), or can be applied to the adherend on-site. Furthermore, the base plate has a structure with which an article and the accessory member thereof can be removably attached. This structure incorporates an inserted structure or a structure screwed in place and the like, however, in terms of ease of handling and manufacturing cost and the like, an inserted structure is beneficial. In one example, an opening or slit and the like can be formed at the prescribed position on an article and accessory member thereof to accept the base plate, the base plate inserted in that part, and fixed in place. Furthermore, even if the base plate and article are normally configured independently, the base plate and the article may be integrated if necessary.

The article support structure of the embodiments of the present invention is used for attaching an article to the adherend with a double-sided adhesive tape, and the combination of the article and adherend can be changed at will. However, as will be apparent from the description of the conventional technology, the article support structure of the present invention is beneficial when attaching hooks and other hanger fittings to wallpaper, typically polyvinyl chloride wallpaper of high-sensitivity and of comparatively weak material.

As noted above, and described in detail below, the best effect obtained with the present invention is the solution of the extremely difficult problems associated with adhesive products for wallpaper. When adhesive products are used for wallpaper, interaction with polyvinyl chloride being the material of the wallpaper, deterioration in adhesive performance due to permeation of plasticizers into the adhesive, and furthermore, the major problems of following the diverse concave-convex surface associated with the design, must be overcome. Furthermore, since the wallpaper is highly sensitive, accommodation of the such highly sensitive materials is essential. In other words, modifications are necessary to ensure that the adhesive products adhere firmly to the wallpaper, while simultaneously completing stretch-release without leaving damage on the highly sensitive surface in the stretch-release process. Repeated research by the present inventors to solve these difficult problems has permitted reliable adherence to concave-convex surfaces by forming a lamination of stretch-release tape and adhesive layers, and simultaneously, incorporation of the features of a product in which firm application, and furthermore, stretch-release, is possible by removal in the entirety with a single pull operation, being the field of the present invention. Furthermore, in the present invention, the remaining problem of a base plate which may have a hook part as necessary, and in which localized damage to the wallpaper surface at the end of the release process when stretch-released from highly sensitive components comprising the surface can be effectively prevented, has been solved.

When the base plate of the present invention is attached to the adherend as the article support structure, firm adhesion to the adherend is possible due to the operation of the double-sided adhesive tape used in combination, and this state of attachment can be maintained. Furthermore, since the base plate has a projection-shaped gripping member, by holding down this gripping member in the stretch-release process, the user can remain at the initial attachment position until the adhesive layer of the double-sided adhesive tape has released. Particularly in the final process of stretch-release, a continuous and equal opposing force is generated simultaneously with the stretch-release force and position can remain unchanged.

BRIEF DESCRIPTION OF THE DRAWINGS

FIG. 1 is a perspective view showing one aspect of the article support structure of the present invention.

FIG. 2 is a perspective view showing a further desirable aspect of the article support structure of the present invention.

FIG. 3 is a perspective view showing one desirable aspect of the article attachment kit of the present invention.

FIGS. 4A and 4B are cross-sectional views showing the method of use of the article support structure of the present invention.

FIG. 5 is a perspective view showing one example of the article support structure used in Experiment Example 2.

DETAILED DESCRIPTION

The present invention is described below in reference to the figures. The article support structure and the article attachment kit used in attaching a hook to wallpaper in particular are described in the figures, however the present invention is not limited to that illustrated.

FIG. 1 is a perspective diagram showing one desirable embodiment of the article support structure according to the present invention. The article support structure 30 is used as an intermediate member between the adherend and an 'article' as described in the present invention when attaching an article to an adherend (not shown) such as wallpaper, for example, when attaching a hanger fitting (not shown) such as a hook with a double-sided adhesive tape 20. The article support structure 30 has a base plate 10 comprised of a plate-shaped base 1. Since the base 1 can be removably attached to an article or accessory member thereof, the guide 3 and insert 2 shown in the figures can also be on the top surface. When this base plate 10 comprises a hook 40 as shown in FIG. 3, the insert 2 can be inserted via the guide 3 into the opening 42 already formed in the body of the hook 40, and bonded integrally to the article. Here, the shape and size of the insert 2 and the guide 3 can be changed as appropriate for the mechanism by which the base plate and the article are engaged, and in some cases these components may be omitted and the engagement mechanism left to the functions of other members. Furthermore, in consideration of light weight and ease of forming and the like, it is desirable that the base plate 10 be formed of, for example, plastic materials such as, acrylic resin, styrene resin, polyurethane resin, polyester resin, or polyvinyl chloride resin and the like.

A stretch-release double-sided adhesive tape 20 is laminated on the surface opposite the adherend of the base plate 10 (bottom surface 1a of base 1). The base plate 10 may also be configured so that the double-sided adhesive tape 20 is laminated on the bottom surface of the base plate 10, or laminated on the base plate 10 immediately prior to use. The double-sided adhesive tape 20 has a stretchable base material 21, and adhesive layers 22 and 23 comprised of an adhesive composition provided on both surfaces of the base material 21, and can be stretch-released due to specific materials used in formation of the base material 21. The adhesive layers 22 and 23 are normally protected by paper (not shown) referred to as 'release paper' and the like.

Though a detailed description is provided below, the base material 21 of the double-sided adhesive tape 20 can be formed from a variety of materials, however it is desirably formed from a single layer or multilayer of a highly stretchable polymer film. Furthermore, the adhesive layers 22 and 23 can be formed from a variety of adhesive compositions. Suitable adhesive compositions are not limited to the compositions enumerated below, and include rubber adhesives to which tackifiers have been added, for example, natural rubber, olefine, silicone, polyisoprene, polybutadiene, polyurethane, styrene-isoprene-styrene block copolymer, styrene-butadiene block copolymer, and other elastomers, and acrylic adhesives either incorporating or not incorporating a tackifiers, for example, C4-C16 alkyl acrylic esters and acrylic acid copolymers and the like.

Furthermore, the double-sided adhesive tape 20 desirably has a pull-tab 24 at the stretch-release start end part (end S of the base plate 10). As shown in the figure, the pull-tab 24 does not have an adhesive layer, and is used solely as means for pulling the adhesive tape. Stretch-release operation can be conducted simply and efficiently with the pull-tab 24. Furthermore, in place of a pull-tab 24 formed integrally as an extension of the adhesive tape 20, a separately manufactured tab or similar tape part may be attached to the end of the base material 1.

Furthermore, the double-sided adhesive tape 20 desirably has an exposed region 21a of the base not covered by the adhesive layer 23 on the bottom surface of the base material 21. In other words, it is desirable that the double-sided adhesive tape 20 does not have an adhesive layer 23 on the end (see end E of base plate 10) opposite the stretch-release start end part of the adhesive tape (attachment end of pull-tab), and comprises a single-surface adhesive tape in the region 21a. By providing the exposed region 21a of the base not covered by the adhesive layer at the end of the adhesive tape 20, the adhesive tape 20 separates from the adherend prior to release from the base plate 10 when the adhesive tape 20 is stretch-released. Therefore, since release can be achieved without applying excessive force to the adherend, damage to the adherend can be more effectively prevented at stretch-release. The size of the exposed region 21a of the base can be variously changed, however the distance from the end of the adhesive tape 20 is normally approximately 15 mm, and desirably between 3 mm and 8 mm from the end of the adhesive tape 20. If the size of the exposed region 21a of the base becomes too large, a problem occurs in that the area of the adhesive layer 23 is proportionally reduced, the base plate adheres incompletely to the adherend, and the base plate releases.

Furthermore, the base plate 10 has a gripping member 5 on the top surface of the base plate 10. The gripping member 5 can be in the shape of a projection projecting from the base plate 10, and is not limited in shape. The gripping member 5 need not necessarily grip, and may also be of a form suitable for holding by pressing with the finger. Furthermore, the gripping member 5 may be in the form of a box-shaped knob as shown in the figure, or in the form of a thin plate knob. The gripping member 5 is beneficially and simultaneously formed from the same plastic material as the base plate 10.

By positioning this gripping member 5 in this manner, the operation by the user of holding down the base plate can be promoted when releasing the double-sided adhesive tape. Furthermore, the user can easily apply a force to the base plate due to the shape of the gripping member, and since the adhesive tape 20 is stretch-released while holding down the base plate 10, the benefit of stretch-releasing the adhesive tape 20 can be obtained without applying an excessive load to only the adherend (wall surface). With the article support structure 30 of the present invention, damage to the wall surface when stretch-releasing the adhesive tape 20 can be beneficially suppressed, and the base plate 10 can be prevented from flying off and shattering. Furthermore, the gripping member 5 can function as means to inform the user of the need to apply a force to the base plate 10 via the gripping member 5.

Furthermore, one more feature of the article support structure of the present invention is the provision of a pair of spacer members 6 on both sides of the base plate 10. The spacer members 6 are desirably formed integrally with the base plate 10, however they may be formed separately. This pair of spacer members 6 function effectively in the action of the present invention as described below. The position of the gripping member 5 and the position of the spacer members 6 desirably and the like partly overlap in the length direction of the double-sided adhesive tape 20, and the base plate can be positioned as desired provided this condition is satisfied.

When the adhesive tape is stretch-released, the spacer members 6 form a gap of less than the thickness at the time of the double-sided adhesive tape 20 being adhered in place, and greater than the thickness at the time of stretch-release of the adhesive tape 20 between the surface of the adherend (wall surface) and the bottom surface of the base plate 10, and a fixed distance (t: see FIG. 4) can be maintained between the spacer members 6. Furthermore, as described above, spacer members 6 at least partly overlap the position of the gripping member 5 in the length direction of the adhesive tape 20.

In the article support structure 30, due to the configuration of the base plate 10 and the spacer members 6, a fixed distance can be maintained between the wall surface and the base plate 10 by the spacer members 6 when stretch-releasing the adhesive tape 20 while holding down the base plate 10. Therefore, since adhesion is not hindered when the adhesive tape 20 adheres in place on the wall surface, and operation of the adhesive tape 20 is not hindered when the adhesive tape 20 is stretch-released from the wall surface, the adhesive tape 20 can be released without tearing. Furthermore, since these important functions can be simultaneously achieved, the adhesive tape 20 can be stretch-released while holding down the base plate 10, and the adhesive tape 20 can be released without applying an excessive load to only the wall surface. Thus, damage to the wall surface when stretch-releasing the adhesive tape 20 can be effectively suppressed, and the base plate 10 can be prevented from flying off and shattering. Furthermore, the gripping member 5 can function as means to inform the user of the need to apply a force to the base plate 10 via the gripping member 5.

The spacer members 6 can be of various shapes and sizes in the implementation of the present invention. Typically, as shown in the article support structure 30 in FIG. 1, the spacer members 6 are long and rod-shaped, in other words, rectangular and extending in the length direction of the base plate 10. The spacer members 6 are desirably formed to include a stretch-release start end part of the adhesive tape 20. When the spacer members 6 are rectangular in shape, the spacer members 6 are generally between approximately 10 mm and 30 mm in length.

If necessary, the spacer members 6 may be comprised of leg-shaped members for which point contact is possible, or may be attached over the entire side surface in the length direction of the base plate 10. FIG. 2 shows one variation of the spacer members, the spacer members 6 being comprised of four leg-shaped projections projecting downwards from the base plate 10. In the article support structure 30 shown in the figures, other configurations are similar to the article support structure 30 described previously in reference to FIG. 1.

A further feature of the present invention resides in the article attachment kit used when attaching an article to the adherend with a double-sided adhesive tape. The article attachment kit of the present invention can be carried out in different embodiments. For example, the article attachment kit includes a combination of the article support structure of the present invention and a stretch-releasable double-sided adhesive tape, a combination of the article support structure of the present invention and an article comprising a hook for hanging an article or other hooks, a combination of the article support structure of the present invention, the article or accessory member thereof and a stretch-releasable double-sided adhesive tape, and other kits. More particularly, in one preferred embodiment of the present invention, the article attachment kit comprises an article or accessory member thereof, the article support structure of the present invention having the base plate, and the double-sided adhesive tape already applied, or able to be applied, to the bottom surface opposite the adherend being the base plate, in combination.

FIG. 3 shows a perspective view of one desirable embodiment of the article attachment kit of the present invention. As shown in the figure, the article attachment kit 50 comprises a combination of the article 40 (a hook in this case), the base plate 10, and the double-sided adhesive tape 20. The base plate 10 is as described in FIG. 1, however the spacer members have been omitted to simplify description. Furthermore, as shown in the figure, it is desirable that the double-sided adhesive tape 20 of the adhesive layers 22 and 23 is provided each applied to release paper 25 and 26. Since the hook 40 has an opening 42 approximately at the central position, the insert 2 of the base plate 10 can be inserted in the direction of the arrow, and both parts integrated. The base plate 10 can be easily separated from the hook 40 as necessary. In the figure, the article attachment kit is shown dismantled in order to simplify understanding of the method of use, however in practice, it is desirable that members are packaged side-by-side on a single backing paper. Furthermore, the base plate itself may be of a hook-shape. In this case, only the combination of the base plate and double-sided adhesive tape can be marketed as the kit.

The article support structure of the present invention can be used as shown in FIGS. 4(A) and (B).

After the release paper is removed from the adhesive layer 22 of the prepared double-sided adhesive tape, the double-sided adhesive tape is applied to the bottom surface of the separate base plate 10. Next, the release paper is removed from the adhesive layer 23 of the double-sided adhesive tape, and the base plate 10 is pressed onto the adherend (wallpaper) 60 and applied. As shown in FIG. 4(A), the base plate 10 can be firmly attached to the wallpaper 60 with the double-sided adhesive tape. The base plate 10 is used in this condition with the hook (not shown) attached, and sufficient adhesive strength can be obtained to prevent a heavy article hung on the hook from falling due to the weight of the article. Since the downwards projection height h is less than the thickness of the adhesive tape in this condition, the spacer members 6 of the base plate 10 float above the adherend 60.

Next, the operation of removing the base plate 10 from the wallpaper 60 with the double-sided adhesive tape 20 attached is described. First, as shown in FIG. 4(B), while holding the gripping member 5 of the base plate 10 in place between the tips of two fingers, the tab 24 at the end of the double-sided adhesive tape is held between the tips of two other fingers, and an appropriate force applied in the direction of the arrow F to pull the tab. Here, since the tab 24 is pulled with the base plate 10 pressed against the adherend 60, the direction in which the double-sided adhesive tape is pulled is naturally restricted to being approximately parallel to the surface of the adherend 60. As a result, the angle at which the adhesive tape is pulled is desirably approximately 35° or less, more desirably approximately 30° or less, and even more desirably approximately 10° or less, to limit the load on the adherend 60.

In the first stage of pulling the tab 24, the initial resistance to the shearing force on the adhesive tape is large. The base material 21 begins to deform when a sufficiently large force is applied to overcome this resistance. Furthermore, the base material 21 deforms, and the adhesive layers 22 and 23 stretch directionally. Release of the adhesive tape does not necessarily require yielding of the base material 21, however when the base material 21 yields, the cross-sectional area is reduced and stiffness increases in the direction of stretch. The effect of this increase in stiffness is to then transfer stress to the interface of the adhesive tape and the wallpaper 60, and the adhesive layers 22 and 23 begin to release. In practice, this release is not accompanied by triaxial stress, and filaments do not develop in the adhesive layers 22 and 23.

Here, release at the small angle of the highly extended adhesive tape of the present invention is characterized by the 'sharp' type of crack generation. As with the destruction of glass-like materials, sharp cracks generate high stress concentration at the tips of small cracks (at which stress is dissipated) of small volume in adhesive compositions. Destruction commonly referred to as 'brittle cleavage destruction' of adhesive compositions occurs due to the high stress concentration at the tips of the cracks. Such destruction typically occurs in association with a small force (due to a low level of energy dissipated in the adhesive compositions), and clearly occurs at the interface.

On the other hand, at a higher release angle, in other words, at an angle greater than 35°, the base material of the adhesive tape does not stretch, and filaments develop in the adhesive composition, aggregating, and resulting in destruction. As with the destruction of glass-like materials, growth of 'blunt' cracks follows crazing. In this model, the development of filaments observed in the adhesive composition occurs as an energy dissipation mechanism similarly to crazy fibrils seen in glass-like materials. As energy dissipation increases, resistance to release increases, and the force required to release the adhesive tape increases. As the volume of the material increases, energy dissipation increases, and stress is no longer concentrated as previously described. Since occurrence of filaments in the adhesive composition therefore could not be avoided with the conventional technology, destruction occurs in an aggregated manner, and residue of the adhesive composition remains on the surface of the adherend, or causes damage to the surface of the adherend. See, International Patent Publication (Kohyo) No. 6-504077 disclosed above for details of these features.

When the afore-mentioned method is adopted, and the adhesive tape is stretch-released while holding down the base plate 10, a fixed distance can be maintained between the wallpaper 60 and the base plate 10 due to the presence of the spacer members 6. Therefore, since this adherence is not hindered when the adhesive tape 20 adheres to the wallpaper 60, and the operation of the adhesive tape is not hindered when stretch-releasing the adhesive tape from the wallpaper 60, the adhesive tape can be released without destruction. Furthermore, the adhesive tape can be stretch-released while holding down the base plate 10, and the adhesive tape can be released without applying excessive load only to the wallpaper 60. Therefore, when stretch-releasing the adhesive tape, damage to the wallpaper 60 can be beneficially suppressed, and the base plate 10 can be prevented from flying off and shattering.

The double-sided adhesive tape used in the implementation of the present invention is described below.

The adhesive tape is stretchable, in other words, has as primary material a base material stretchable with the prescribed rate of extension when stretched in the length direction. The base material usable here is desirably comprised of a highly stretchable polymer film. When used in the specification of the present application, 'highly stretchable' indicates that the adhesive tape (base material) has the quality of extending by at least approximately 150% of the original length when stretched in the length direction. The base material used in the implementation of the present invention may be varied according to the purpose of use of the adhesive tape, and can normally be stretched by between approximately 50% and 1200%. When the rate of extension of the base material is less than 50%, the stretch-release effect according to the present invention can no longer be obtained, and conversely, when the rate of extension of the base material is more than 1200%, release of the adhesive tape from the adherend with the appropriate timing becomes difficult. The base material can desirably stretch by between approximately 150% and 700%, and more desirably can stretch by between approximately 350% and 700%.

The highly stretchable polymer film usable as the base material can include a variety of polymer films, however desirably the polymer films (1) through (4) enumerated below can be used singly, or in combinations of two or more.

(1) Polymer film having an extension of between approximately 50% and 1200% to the rupture point in the length direction with elastic recovery following extension of less than about 50%, and a Young's modulus of between approximately 1000 psi and 72,500 psi (in other words, between approximately 6,894.7 and 499,865.8 Kpa) (first polymer film).

(2) Foamed polymer film (second polymer film).

(3) Polymer film having a yield point stress, or a proportional limit point stress, of approximately 20 N/15 mm or less, a tensile rupture strength of approximately 30 N/15 mm or more, and an extension to rupture point of approximately 150% or more (third polymer film).

(4) Polymer film including thermoplastic rubber and adhesive forming resin (fourth polymer film).

When two or more of these polymer films, or other polymer films, are used in combination, it is desirable that the entire polymer film is used integrally bonded as a compound film or a laminated film. The method of integrating the polymer film is not particularly limited, and can be simultaneous forming, joining with adhesive, or joining by pressure, and the like.

Typical examples of the polymer films (1) through (4) are each described in detail below. The composition and configuration and the like of the various polymer films are not particularly limited, and other polymer films may be employed.

Representative examples of the first polymer film are not limited to the following, however include polyolefines such as polyethylene, for example high-density polyethylene, low-density polyethylene, linear low-density polyethylene, and linear ultra-low-density polyethylene, polypropylene and polybutylene; vinyl copolymers, for example polyvinyl chloride (both plasticized and non-plasticized), polyvinyl acetate; olefine copolymers, for example ethylene/methacrylate copolymers, ethylene/vinyl acetate copolymers, acrylonitrile-butadiene-styrene copolymers, and ethylene-propylene copolymers; acrylic polymers and copolymers; and combinations of the above compounds. Materials having plasticity, or plasticity and elasticity, for example, polypropylene/polyethylene, polyurethane/polyolefine, polyurethane/polycarbonate, and polyurethane/polyester and the like can also be used as desired. These polymer films can be of a single layer or laminated film, nonwoven film, porous film, foamed film, and a combination of the above. Polymer films may also be of filled material, for example, filled film such as calcium carbonate-filled polyolefin. Polymer films are desirably selected from polyethylene and polypropylene film, the most desirable material being linear low-density and linear ultra-low-density polyethylene film.

Representative examples of the second polymer film are not limited to the following, however include polyethylene including high-density polyethylene, low-density polyethylene, linear low-density polyethylene, and linear ultra-low-density polyethylene, polyolefines such as polypropylene and polybutadiene; vinyl copolymers such as polyvinyl chloride (both plasticized and non-plasticized) and polyvinyl acetate; olefine copolymers such as ethylene/methacrylate copolymers, ethylene/vinyl acetate copolymers, acrylonitrile-butadiene-styrene copolymers and ethylene/propylene copolymers; acrylic polymers and acrylic copolymers; polyurethane; and combinations of the above. Any plastic material, or any compound or combined material having plastic and elastomer qualities such as polypropylene/polyethylene, polyurethane/polyolefine, polyurethane/polycarbonate, or polyurethane/polyester may be used.

Representative examples of the third polymer film are not limited to the following, however include polyolefines such as high-density polyethylene (HDPE), low-density polyethylene (LDPE), linear low-density polyethylene (LLDPE), linear ultra-low-density polyethylene (U-LLDPE), and polypropylene (PP), plyvinyl copolymers such as polyvinyl chloride (PVC) and polyvinyl acetate (PVA), polyolefine copolymers such as ethylene-methacrylic acid copolymer (EEMA) and ethylene-vinyl acetate copolymer (EVA), block copolymers such as acrylic polymers and styrene-isoprene-vinyl acetate copolymers, and various thermoplastic elastomers (TPE) such as polyolefine and the like. Polymer films may be formed from one of these polymers, or from a mixture of two or more of these polymers.

The fourth polymer film is a polymer film including thermoplastic rubber and adhesive forming resin, in other words, a rubber-resin polymer film. Here, the rubber component is unvulcanized, and provides the polymer film with the necessary rubber elasticity and cohesion. Styrene-butadiene block copolymers and styrene-isoprene block copolymers and the like can be used as the thermoplastic rubber. On the other hand, the resin component provides superior adhesion to a variety of adherends. An ester, or a naturally-occurring or synthetic resin existing as a free acid, for example, a rosin conductor, a terpen resin, a terpen-phenol resin, or a synthetic oil resin and the like, can be used as the adhesive forming resin. These resins may be hydrogenated, disproportionated, or dimerizated.

The afore-mentioned polymer film and other suitable polymer films can be used in single layers as the base material of the adhesive tape, and may also be used as a laminated structure of two or more layers, or as a composite structure. When used as a laminated structure, a plurality of layers of the same polymer film may be laminated together, or two or more differing polymer films and the like may be combined in lamination as desired. In each case, types of materials other than the base material of the present invention may be laminated on the surface of the laminated structure, or inserted within the laminated structure.

The base material can be used in a variety of thicknesses according to the configuration and purpose of use of the adhesive tape, however thickness is generally between approximately 10 μm and 30 mm. When thickness is less than 10 μm, the tape is too thin and manufacture becomes difficult, and ease of handling of the adhesive tape itself also deteriorates. Conversely, when thickness is greater than 30 mm, the tape obtained is too thick and ease of handling deteriorates, manufacturing costs increase, and application is limited. The thickness of the base material is desirably between approximately 10 μm and 10 mm.

The base material may be used unchanged, however the base material may have an auxiliary adhesive layer on one or both sides. In other words, when the base material comprises a polymer film, it is desirable that an auxiliary adhesive layer comprised of an adhesive of the same type as, or a different type from, the adhesive material composition comprising the adhesive tape, is provided on one or both sides of the polymer film. By previously providing an auxiliary adhesive layer on one or both sides of the base material in this manner, the joining effect of the adhesive layer, and the effect of preventing the occurrence of adhesive residue on, and damage to, the adherend, can be improved.

Furthermore, the auxiliary adhesive layer and the adhesive layer can be formed without any treatment of the surface the base material, however prior priming treatment is desirable to improve the adhesive effect of both surfaces. Priming treatment can include corona discharge, plasma discharge, flame treatment, electron beam irradiation, ultraviolet irradiation, and primer coating and the like.

The adhesive tape according to the present invention is an adhesive layer comprised of an adhesive composition applied to both sides of the base material. The adhesive composition used in formation of the adhesive layer is normally comprised of at least two types of components. In the practice of the present invention, use of a combination of a first component having cohesion (the cohesive component), and a second component (the basic component) is beneficial, and use of an adhesive composition comprising at least a mixture of these two types of components is particularly beneficial. These components are described below.

(1) First Component

The first component is the cohesive component. The cohesive component includes a styrene block copolymer as the primary component. The styrene block copolymer employed in the implementation of the present invention includes for example, styrene-isoprene block copolymers, styrene-butadiene block copolymers, styrene-ethylene-propylene block copolymers, and styrene-ethylene-butylene block copolymers and the like.

Furthermore, this cohesive component can be added to the styrene block copolymers to provide a tackifier. Suitable tackifiers are not limited to the components enumerated below, and include rosin resin, rosin ester resin, hydrogenated rosin ester resin, terpen resin, terpen-phenol resin, hydrogenated terpen resin, petroleum resin, hydrogenated petroleum resin, cumarone resin, styrene resin, denatured styrene resin, xylene resin, and epoxy resin and the like.

Furthermore, the first component can include other additives as necessary. Suitable additives are softening agents, antioxidants, and ultraviolet stabilizers and the like. Paraffin and naptha softening agents, and phthalic acid ester softening agents, and the like are available. Furthermore, hindered phenol and hindered amine antioxidants, and the like are available.

(2) Second Component

The second component is the base component. The base component includes a (meta) acrylic copolymer, and desirably a nitrogen-containing (meta) acrylic copolymer. The nitrogen-containing (meta) acrylic copolymer can include various types of copolymers, and desirably includes a (meta) alkyl acrylate ester-nitrogen-containing vinyl monomer copolymer.

The (meta) alkyl acrylate ester-nitrogen-containing vinyl monomer copolymer can be prepared compolymerized with various ratios of (meta) alkyl acrylate ester and nitrogen-containing vinyl monomer, however this copolymer is desirably comprised of between approximately 45 and 99.9 parts by weight of (meta) alkyl acrylate ester, and between approximately 0.1 and 20 parts by weight of nitrogen-containing vinyl monomer. Furthermore, since the liquid of the mixed adhesive composition is not readily separated into top and bottom layers in the liquid state, between zero and approximately 30 parts by weight of polystyrene having a glass transition point of between approximately 20° C. and 250° C., and a weight-average molecular weight of between approximately 2,000 and 500,000 as measured with gel permeation chromatography (GPC) may be grafted onto this nitrogen-containing (meta) acrylic copolymer as necessary. Furthermore, the nitrogen-containing (meta) acrylic copolymer may be copolymerized as necessary with between approximately 0.1 and 5 parts by weight of a vinyl monomer having a reactive functional group in the side chain.

The first and second components can be mixed in various ratios in the adhesive composition, and the mixing ratio is not particularly regulated. The mixing ratio of the first component and the second component is normally between approximately 5:95 and 95:5 (solids ratio), and is desirably between approximately 25:75 and 90:10. If the ratio of mixture of the two types of component is within this range, the problem of occurrence of adhesive residue on the adherend, and the problem of damage to the adherend due to strong adhesion can be eliminated since the cohesiveness of the adhesive is sufficiently large when releasing and removing the adhesive tape from the adherend. Furthermore, even when adhesive tape is applied to polyvinyl chloride sheet and wallpaper and the like including plasticizer in the manufacture of the adhesive structure of the present invention, the cohesion and adhesion of the adhesive tape is not dramatically reduced due to migration of the plasticizer to the adhesive layer.

The thickness of the adhesive layer can be changed within a wide range in accordance with the purpose of use and configuration of the adhesive tape. Thickness of the adhesive layer is normally between approximately 10 μm and 1,000 μm, is desirably between approximately 10 μm and 400 μm, and is more desirably between approximately 10 μm and 200 μm. Within this desirable range of thickness, there is a tendency for adhesive tape to be more readily removable for a thicker layer than for a thinner layer. This contrasts with the normal method of removal, for example, removal by release at a release angle of 90° or greater. Generally, a thicker layer prior to adhesion shows a tendency for a greater release force at a release angle of 180° of the adhesive tape than a thinner layer prior to adhesion. When the adhesive tape is removed by stretching at a low angle of less than 35°, the adhesive composition tends to be restricted by the base material, and forced to stretch significantly. Under these conditions, the adhesive layer shrinks, reducing the cross-sectional area. Since the cross-sectional area of a thinner adhesive layer, in other words, thickness×width, is already less than that of a thicker adhesive layer, stress, in other words, force per unit area, is greater in the thinner layer than in the thicker layer. In practice, this leads to increased stiffness of the adhesive composition. Since a layer with greater stiffness shows greater resistance to deformation, the force necessary for release is increased.

The adhesive layer may be used unchanged, however the adhesive layer is desirably used after covering with release paper (also known as a 'release liner' and the like). By covering the adhesive layer with a release liner, handling of the adhesive tape is improved, and the tape may be handled in rolls prior to processing. The release liner can be, for example, paper treated with a silicone compound and the like for mold release, or plastic film and the like.

EXAMPLES

The present invention is described below in reference to the examples. The present invention is naturally not limited to these examples.

Manufacturing Example 1

Manufacture of Base Plates

Base plates incorporating a gripping member and/or spacer members were manufactured of styrene resin for experimental use.

(1) Base Plate with Gripping Member Only

Of similar shape to the base plate 10 shown schematically in FIG. 5. Base 1 dimensions of 50 mm (length)×15 mm (width)×1.5 mm (thickness). The gripping member (5 mm (vertical)×5 mm (horizontal)×5 mm (height)) 5 was attached at the differing points (0), (1), (2), (3), (4), and (5) in the figure. Except for the lack of the spacer members, the shape of the base plate 10 is similar to the shape of the base plate 10 described in detail in FIG. 1.

(2) Base Plate with Spacer Members Only

Except for the lack of the gripping member 5, the shape is similar to the shape of the base plate 10 shown schematically in FIG. 1. Base 1 dimensions of 50 mm (length)×15 mm (width)×1.5 mm (thickness). The pair of spacer members (10 mm (length)×3 mm (width) 6 are attached to each side of the base 1. The attachment positions of the spacer members 6 were the sections (0-1), (1-2), (2-3), (3-4), and (4-5) in the figure. For example, the section (0-1) refers to the spacer members attached between the points (0) and (1).

(3) Base Plate with Gripping Member and Spacer Members

Of similar shape to the base plate 10 shown schematically in FIG. 1. Base 1 dimensions of 50 mm (length)×15 mm (width)×1.5 mm (thickness). The gripping member (5 mm (vertical)×5 mm (horizontal)×5 mm (height)) 5 was attached at the differing points (0), (1), (2), (3), and (4) in the figure. Furthermore, the attachment positions of the spacer members (10 mm (length)×3 mm (width)) 6 were the sections (0-1), (1-2), (2-3), (3-4), and (4-5) in the figure.

Manufacturing Example 2

Manufacture of Double-Sided Adhesive Tape

The double-sided adhesive tape shown schematically in FIG. 1 was manufactured.

Firstly, a 800 μm thick foamed polymer film (Volara™ 6EO, manufactured by Sekisui Corp. (USA)) forming the core layer, and a 50 μm thick solid polymer film (XMAX™ 161.1, Consolidated Thermoplastics Co.) forming the surface layer were prepared. The solid polymer film was laminated on both sides of the foamed polymer film and heat sealed.

After manufacturing the base 1, both sides of the base 1 were corona-discharge treated and a primer applied. The primer used here was a reaction-type synthetic resin primer (product name: K500, manufactured by 3M Corp.). After application of primer, an acrylic sticky sheet (manufactured by 3M Corp.) with release paper on both sides of the base material was applied to form the adhesive layers 22 and 23, and 5 mm of the adhesive layer 23 was removed from the end of the adhesive layer 23 to expose the base material of the backing.

The double-sided adhesive tape 20 thus obtained was cut to 65 mm (length)×15 mm (width) and the adhesive layer removed over a length of 15 mm to form a pull-tab 24.

Experiment Example 1

Reference Example 1

In the present example, a base plate with spacer members and without a gripping member was applied to the wallpaper in order to evaluate the function of the spacer members on the base plate. The wallpaper used here was a polyvinyl chloride-based wallpaper manufactured by Lilycolor Co. Ltd (product number LY9540, noted in 'Lilycolor Base' catalog).

The double-sided adhesive tape of Manufacturing Example 2 was applied to the bottom surface of the base plate manufactured in Manufacturing Example 1 (2) to which the spacer members were attached at differing positions as disclosed in Table 1 below. A peel test was conducted after one hour had elapsed following complete application of the base plate. As disclosed in Table 1 below, the pull-tab was pulled in the horizontal direction while holding down the points (0.5; intermediate position between point 0 and point 1), (1.5), (2.5), (3.5), (4.5), and (5) on the base plate with the fingers, and the adhesive tape stretch-released. The stretch-release test was conducted 12 times (partially 17 times) for each base plate, and the number of times (percentage) the adhesive tape could be released without damage to the wallpaper recorded. The measurement results disclosed in Table 1 below were obtained.

TABLE 1

| Position of spacer member | Hold-down position of base plate (with out gripping member) | | | | |
|---|---|---|---|---|---|
| | 0.5 | 1.5 | 2.5 | 3.5 | 4.5 |
| 4-5 | 92% | 8% | 0% | 0% | 67% |
| 3-4 | 83% | 17% | 8% | 71% | 0% |
| 2-3 | 100% | 83% | 75% | 0% | 0% |
| 1-2 | 100% | 92% | 8% | 0% | 0% |
| 0-1 | 75% | 42% | 8% | 0% | 0% |

As is apparent from the measurement results disclosed in Table 1, when only the spacer members are attached to the base plate, the possibility of damage to the wallpaper is considerable according to the position at which the base plate is held down. Furthermore, it is also apparent that destruction of the wallpaper cannot be effectively prevented with only the spacer members.

Experiment Example 2

Reference Examples 2 and 3, Comparative Examples 1 through 4

As shown in FIG. 5, in the present example, a base plate 10 with a gripping member and without spacer members was applied to the wallpaper with the adhesive tape 20 in order to evaluate the function of the gripping member on the base plate. The wallpaper used here was a polyvinyl chloride-based wallpaper manufactured by Lilycolor Co. Ltd (product number LY9540, noted in 'Lilycolor Base' catalog).

The double-sided adhesive tape 20 of Manufacturing Example 2 was applied to the bottom surface of the base plate 10 manufactured in Manufacturing Example 1 (1) to which the gripping member is attached at differing positions (see FIG. 5) as disclosed in Table 2 below. A peel test was conducted after one hour had elapsed following complete application of the base plate 10. The pull-tab 24 was pulled in the horizontal direction while holding down each gripping member 5 with the fingers, and the adhesive tape stretch-released. The stretch-release test was conducted 20 times for each base plate 10, and the presence or not of damage to the wallpaper visually observed. The observation results disclosed in Table 2 below were obtained.

TABLE 2

| Example No. | Position of gripping member | No damage | With damage | Percentage damage prevention |
| --- | --- | --- | --- | --- |
| Reference Example 2 | Point 0 | 20 | 0 | 100% |
| Reference Example 3 | Point 1 | 17 | 3 | 85% |
| Comparative Example 1 | Point 2 | 12 | 8 | 60% |
| Comparative Example 2 | Point 3 | 11 | 9 | 55% |
| Comparative Example 3 | Point 4 | 5 | 15 | 25% |
| Comparative Example 4 | Point 5 | 5 | 15 | 25% |

As is apparent from the observed results disclosed in Table 2, when only the gripping member 5 is attached to the base plate 10, the probability of damage to the wallpaper is low when the gripping member 5 is positioned at a distance of up to approximately 1 cm from the end of the adhesive tape opposite the attachment position of the pull-tab 24, however when the gripping member 5 is at any other position, the probability of damage to the wallpaper is considerable.

Experiment Example 3

Examples 1 through 5

In the present example, a base plate with both the spacer members and the gripping member was applied to the wallpaper in order to evaluate the combined function of the spacer members and the gripping member on the base plate. The wallpaper used here was a polyvinylchloride-based wallpaper manufactured by Lilycolor Co. Ltd (product number LY9540, noted in 'Lilycolor Base' catalog).

The double-sided adhesive tape of Manufacturing Example 2 was applied to the bottom surface of the base plate manufactured in Manufacturing Example 1 (3) to which the spacer members and the gripping member were attached at differing positions (see FIG. 1) as disclosed in Table 3 below; and the base plate applied to the wallpaper. A peel test was conducted after one hour had elapsed following complete application of the base plate. The pull-tab was pulled in the horizontal direction while holding down each gripping member with the fingers, and the adhesive tape stretch-released. The stretch-release test was conducted 20 times for each base plate, and the presence or not of damage to the wallpaper visually observed. The observation results disclosed in Table 3, below were obtained.

TABLE 3

| Example No. | Position of spacer member | Position of gripping member | No damage | With damage | Percentage damage prevention |
| --- | --- | --- | --- | --- | --- |
| Example 1 | 0-1 | 0 | 20 | 0 | 100% |
| Example 2 | 1-2 | 1 | 20 | 0 | 100% |
| Example 3 | 2-3 | 2 | 20 | 0 | 100% |
| Example 4 | 3-4 | 3 | 27 | 3 | 90% |
| Example 5 | 4-5 | 4 | 23 | 7 | 76.7% |

As is apparent from the observed results disclosed in Table 3, when both the spacer members and the gripping member are attached to the base plate, the possibility of release without damage to the wallpaper is high, irrespective of the position at which these members are attached to the base plate.

Experiment Example 4

Example 6, Comparative Examples 5 and 6

Example 6

The method disclosed in the Experiment Example 3 was repeated, however in the present example, the size of the spacer members was changed from 10 mm (length)×3 mm (width) to 0.20 mm (length)×3 mm (width) and attached in section (4-5). Furthermore, the shape of the gripping member was changed from box-like (5 mm (Vertical)×5 mm (horizontal)×5 mm (height)) to a thin plate (5 mm (width)×2 mm (thickness)×5 mm (height)), and attached at point 4.

The double-sided adhesive tape was applied to the bottom surface of the base plate, and the base plate applied to the wallpaper. A peel test was conducted after one hour had elapsed following complete application of the base plate. The pull-tab was pulled in the horizontal direction while holding down the gripping member with the fingers, and the adhesive tape stretch-released. The stretch-release test was conducted 30 times. When the presence or not of damage to the wallpaper was visually observed, the possibility of release without damage in all tests was confirmed.

Comparative Example 5

The method disclosed in Example 6 was repeated, however in the present example, for the purposes of comparison, in place of the adhesive layer 23 of the double-sided adhesive tape, 5 mm of the adhesive layer 22 applied on the opposite side was removed from the end to expose the base material of the backing.

The double-sided adhesive tape was applied to the bottom surface of the base plate, and the base plate applied to the wallpaper. A peel test was conducted after one hour had elapsed following complete application of the base plate. The pull-tab was pulled in the horizontal direction while holding down the gripping member with the fingers, and the adhesive tape stretch-released. The stretch-release test was conducted 16 times. When the presence or not of damage to the wallpaper was visually observed, the possibility of release without damage was confirmed in only one test, and release with damage was confirmed in the remaining 15 tests.

Comparative Example 6

The method disclosed in Example 6 was repeated, however in the present example, for the purposes of comparison, attachment of the spacer members to the base plate was omitted.

The double-sided adhesive tape was applied to the bottom surface of the base plate, and the base plate applied to the wallpaper. A peel test was conducted after one hour had elapsed following complete application of the base plate. The pull-tab was pulled in the horizontal direction while holding down the gripping member with the fingers, and the adhesive tape stretch-released. The stretch-release test was conducted 15 times. When the presence or not of damage to the wallpaper was visually observed, release with damage was confirmed in all tests.

What is claimed is:

1. An article support structure used for attaching an article through a stretch-releasable double-sided adhesive tape to an adherend, comprising:
   a base plate which can be removably attached to the article or accessory member thereof, wherein the base plate comprises:
      a base having a top major face and an opposing bottom major face, the base defining a length and width, the length being greater than the width,
      a guide extending entirely along the top major face,
      an insert platform connected to the guide opposite the top major face,
      wherein a slot is defined between the insert platform and the top major face;
   a projection-shaped gripping member projecting from the insert platform outwardly beyond the top major face in a direction opposite the bottom major face that faces the adherend, the gripping member defining a length in a direction of the length of the base, the length of the gripping member being less than the length of the base; and
   at least one pair of spacer members provided on both sides of the base, the spacer members each projecting outwardly beyond the bottom major face in a direction opposite the top major face to define a gap relative to the bottom major face that is less than a thickness of the double-sided adhesive tape when adhered in place, and greater than the thickness of the double-sided adhesive tape when released, between a surface of the adherend and the bottom major face of the base, when the double-sided adhesive tape is stretch-released;
   wherein a position of the gripping member at least partly overlaps a position of the spacer members in the length direction of the base.

2. The article support structure according to claim 1, wherein the spacer members comprise rectangular members extending in the length direction of the base.

3. The article support structure according to claim 1, wherein the spacer members comprise leg-shaped members attached to the base.

4. An article attachment kit comprising:
   an article support structure according to claim 1; and
   a stretch-releasable double-sided adhesive tape comprising a stretchable base material and an adhesive layer provided on both sides of the base material.

5. The article attachment kit according to claim 4, wherein the adhesive layer of the double-sided adhesive tape comprises a rubber adhesive having added thereto a tackifier or an acrylic adhesive either incorporating or not incorporating a tackifier.

6. The article attachment kit according to claim 4, wherein the double-sided adhesive tape is provided with a pull-tab not having the adhesive layer at a stretch-release start end part thereof.

7. The article attachment kit according to claim 1, wherein the double-sided adhesive tape does not have the adhesive layer on an adherend side of the base material, at an end part opposite the stretch-release start end part to form a single-sided adhesive tape in this region.

8. An article attachment kit, comprising:
   the article support structure according to claim 1; and
   an article comprising a hook for hanging an article.

9. An article attachment kit, comprising:
   the article support structure according to claim 1;
   an article or accessory member thereof; and
   a stretch-releasable double-sided adhesive tape comprising a stretchable base material and an adhesive layer provided on both sides of the base material.

10. The article support structure according to claim 1, wherein each of the spacer members defines a length in the direction of the length of the base, and further wherein relative to the direction of the length of the base, the length of each of the spacer members at least partially overlaps the length of the gripping member.

11. The article support structure according to claim 1, wherein the gripping member is a box-shaped knob.

12. The article support structure according to claim 11, wherein the guide connects the insert platform with the top major face of the base.

13. The article attachment kit according to claim 6, wherein the article support structure and the double-sided adhesive tape are configured to attach the bottom major face of the base to one of the adhesive layers of the double-sided adhesive tape and locate an end of each of the gripping members immediately adjacent the pull-tab.

14. The article attachment kit according to claim 9, wherein:
   the gripping member is a knob projecting from the insert platform; and
   the article includes a hook projecting from a frame;
   and further wherein the frame is configured to be slidably received within the slot such that the kit is repeatedly transitionable between an assembled state in which the article is mounted to the base plate and a disassembled state in which the article is completely removed from the article support structure, the assembled state including the hook projecting outwardly beyond the gripping member.

* * * * *

UNITED STATES PATENT AND TRADEMARK OFFICE
CERTIFICATE OF CORRECTION

PATENT NO. : 8,241,720 B2  
APPLICATION NO. : 12/162518  
DATED : August 14, 2012  
INVENTOR(S) : Yasuo Sudo Page 1 of 1

It is certified that error appears in the above-identified patent and that said Letters Patent is hereby corrected as shown below:

<u>Title Page, Item (57) (Abstract)</u>  
Line 10, delete "stre tenable" and insert -- stretchable --, therefor.

Line 17, delete ""double" and insert -- double --, therefor.

<u>Column 12</u>  
Line 19, delete "plyvinyl" and insert -- polyvinyl --, therefor.

<u>Column 13</u>  
Line 43, delete "cumarone" and insert -- coumarone --, therefor.

Line 61, delete "compolymerized" and insert -- copolymerized --, therefor.

<u>Column 16</u>  
Line 29, delete "(with out" and insert -- (without --, therefor.

<u>Column 18</u>  
Line 16, delete "0.20 mm" and insert -- 20 mm --, therefor.

Signed and Sealed this  
Twelfth Day of March, 2013

Teresa Stanek Rea  
*Acting Director of the United States Patent and Trademark Office*